No. 780,482. PATENTED JAN. 17, 1905.
J. F. DURYEA.
FRICTION CLUTCH.
APPLICATION FILED MAR. 27, 1900. RENEWED MAY 12, 1904.

Witnesses: Samuel W. Balch, W. Myron Reynolds.

Inventor, J. Frank Duryea, by Thomas Ewing, Jr., Attorney.

No. 780,482.

Patented January 17, 1905.

UNITED STATES PATENT OFFICE.

JAMES FRANK DURYEA, OF SPRINGFIELD, MASSACHUSETTS.

FRICTION-CLUTCH.

SPECIFICATION forming part of Letters Patent No. 780,482, dated January 17, 1905.

Application filed March 27, 1900. Renewed May 12, 1904. Serial No. 207,694.

*To all whom it may concern:*

Be it known that I, JAMES FRANK DURYEA, a citizen of the United States of America, and a resident of Springfield, county of Hampden, State of Massachusetts, have invented certain new and useful Improvements in Friction-Clutches, of which the following is a specification.

The clutch is of the type in which the engagement of the two members is between shoes carried by one member and thrust radially outward against a cylindrically-bored surface of the other member.

The invention has for its object economy of space lengthwise on the shaft and improvement in the construction of the parts whereby they may be more conveniently assembled and adjusted than according to present practice.

Figure 1:
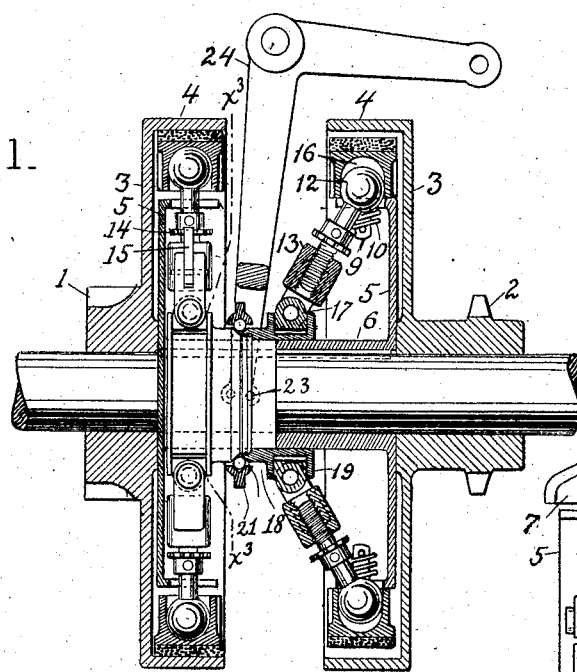
Figure 3:
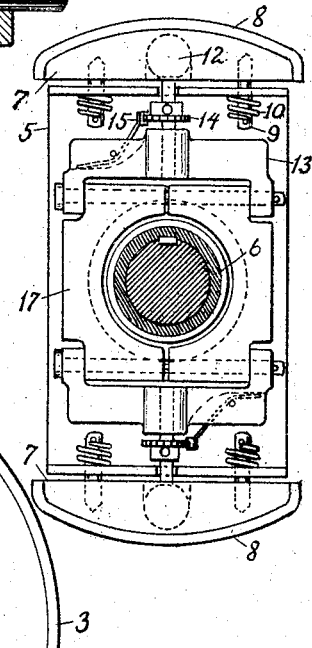
Figure 2:
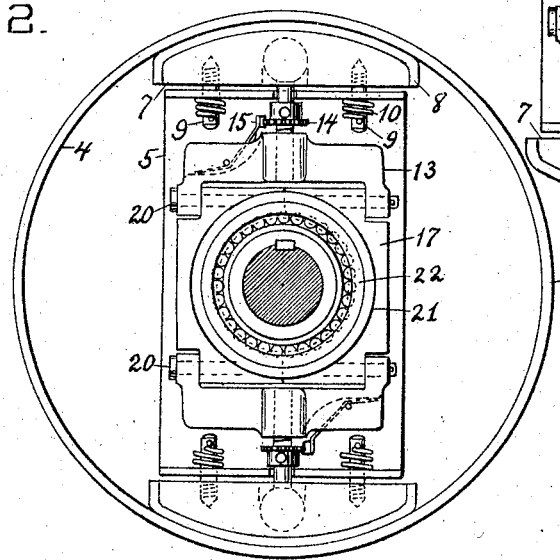

In the accompanying sheet of drawings, which forms a part of this specification, Figure 1 shows two like friction-clutches, partly in section, constructed in accordance with this invention. Fig. 2 shows a front view of one of the clutches. Fig. 3 shows a section through the lines $x^3$ $x^3$ of Fig. 1, only the member carrying the shoes being shown.

Two clutches are shown operated by a single lever. One clutch is shown as used to connect a gear 1 and the other as used to connect a sprocket-wheel 2 with the shaft on which the clutches are mounted. The clutch member 3, which is connected with a sprocket wheel or gear, has a cylindrically-bored rim 4. Within the rim is a plate 5, having a hub 6, which is keyed to the shaft. At the ends of this plate are the shoes 7, the outer faces of which are covered, preferably, with leather 8 and curved to fit the rim. Studs 9 in the shoes pass through holes in the plate, and springs 10 around the studs draw the shoes away from the rim. The shoes are pressed outwardly against the rim to apply the clutch by means of toggles. Each toggle is a bolt 11 with a ball-shaped head 12, which is screwed in a forked member 13. The length of the toggle is adjusted by turning the bolt. On each bolt is a toothed flange 14, which is engaged by the end of the spring 15. This spring is set in a groove in the forked member of the toggle. It locks the bolt against accidental displacement after it has been adjusted. The ball-shaped heads of the bolts set in sockets 16 in the shoes. Between the forked ends of the toggles is an equalizing-plate 17. This plate is mounted on the flanged sliding sleeve 18. The two sleeves, one of which is illustrated in section and the other in elevation, are shown as screwed together at their connecting edges. The flanges 19 of the sleeve 18 guide the parallel faces of the equalizing-plate 17. The opening in this plate through which the sleeve passes is larger than the body of the sleeve. The plate is therefore transversely movable with respect to the sliding sleeve, but is guided by the flanges and is carried longitudinally with the sleeve when the latter is slid on the shaft. For convenience in assembling the equalizing-plate is in two parts, held together by the forked ends of the toggles and the hinge-pins 20. Each pin passes through both parts of the plate and the forked ends of one of the toggles.

Encircling the sliding sleeve is a collar 21 with a ball-bearing joint 22 between it and the sleeve. The joint connects the collar and the sleeve so that the sleeve can be slid longitudinally by the collar and the collar will not revolve with the sleeve. A flange on the collar is engaged by pins 23 on the ends of a forked lever 24, which is operated to apply the clutch.

The drawings show two clutches operated by the same forked lever. Each clutch has all of the elements enumerated excepting the lever, collar, and ball-bearing for the collar, which are common to the two clutches. The sleeves for the two clutches are screwed together, and the ball-bearing is at the meeting-point. Operation of the forked lever in one direction applies one of the clutches and in the other direction applies the other clutch.

What I claim as new, and desire to secure by Letters Patent of the United States, is—

1. In a friction-clutch, the combination of two engaging members, one of the members having a cylindrically-bored rim, and the other member consisting of a plate with radially-movable friction-shoes mounted thereon, a flanged sliding sleeve, an equalizing-plate in two parts mounted on the sleeve and transversely movable with respect thereto, forked toggles between the equalizing-plate and the shoes, a hinged pin through the forks of each toggle and both parts of the equalizing-plate, and means for applying the clutch through the sliding sleeve, substantially as described.

2. In a friction-clutch, the combination of two engaging members, one of the members having a cylindrically-bored rim, and the other member consisting of a plate with radially-movable friction-shoes mounted thereon, a flanged sliding sleeve, an equalizing-plate mounted on the sleeve and between the flanges thereon and transversely movable in respect to the sleeve, toggles between the equalizing-plate and shoe, and means for applying the clutch through the sliding sleeve, substantially as described.

Signed by me in New York, borough of Manhattan, this 26th day of March, 1900.

J. FRANK DURYEA.

Witnesses:
    THOMAS EWING, Jr.,
    SAMUEL W. BALCH.